United States Patent
Ito et al.

(10) Patent No.: US 11,005,506 B2
(45) Date of Patent: May 11, 2021

(54) COMMUNICATION APPARATUS

(71) Applicant: DENSO CORPORATION, Kariya (JP)

(72) Inventors: Takasuke Ito, Kariya (JP); Yoshiyuki Kono, Kariya (JP); Tomoyuki Takiguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/844,218

(22) Filed: Apr. 9, 2020

(65) Prior Publication Data

US 2020/0235763 A1    Jul. 23, 2020

Related U.S. Application Data

(63) Continuation of application No. PCT/JP2018/038823, filed on Oct. 18, 2018.

(30) Foreign Application Priority Data

Oct. 26, 2017  (JP) .............................. JP2017-207051

(51) Int. Cl.
  *G08C 25/00* (2006.01)
  *H04B 1/04* (2006.01)
(52) U.S. Cl.
  CPC ............... *H04B 1/04* (2013.01); *G08C 25/00* (2013.01)
(58) Field of Classification Search
  CPC .......... H04B 1/04; G08C 25/00; G08C 19/00; H04L 29/14
  See application file for complete search history.

(56) References Cited

U.S. PATENT DOCUMENTS

| | | | | |
|---|---|---|---|---|
| 6,144,569 A | * | 11/2000 | Rodriguez | G06F 1/30 363/49 |
| 2002/0193935 A1 | * | 12/2002 | Hashimoto | F02D 41/22 701/110 |
| 2013/0132018 A1 | | 5/2013 | Kubota et al. | |
| 2015/0271574 A1 | * | 9/2015 | Omori | G06F 1/28 340/870.16 |
| 2019/0257148 A1 | * | 8/2019 | Healam | E06B 9/17046 |
| 2020/0149631 A1 | * | 5/2020 | Tachibanada | F16H 63/483 |

FOREIGN PATENT DOCUMENTS

JP    2016-111501    6/2016

* cited by examiner

*Primary Examiner* — Kenneth T Lam
(74) *Attorney, Agent, or Firm* — Nixon & Vanderhye P.C.

(57) ABSTRACT

A communication apparatus operates with a supply voltage of a power and transmits a sensor value with a digital communication method using consecutive frames. In the communication apparatus, a data source unit is configured to generate a frame using a data of a sensor value processed by a signal processing unit. A switching unit is configured to perform a signal switching to permit a transmission circuit to perform a re-transmission of re-transmitting a signal including the sensor value stored in a memory in response to a restoration of the power after an instantaneous power interruption. A frame monitoring unit is configured to monitor a status of a frame transmission and determine a frame at the occurrence of the instantaneous power interruption. The sensor value to be re-transmitted is determined based on information of the frame determined by the frame monitoring unit at the occurrence of the instantaneous power interruption.

21 Claims, 16 Drawing Sheets

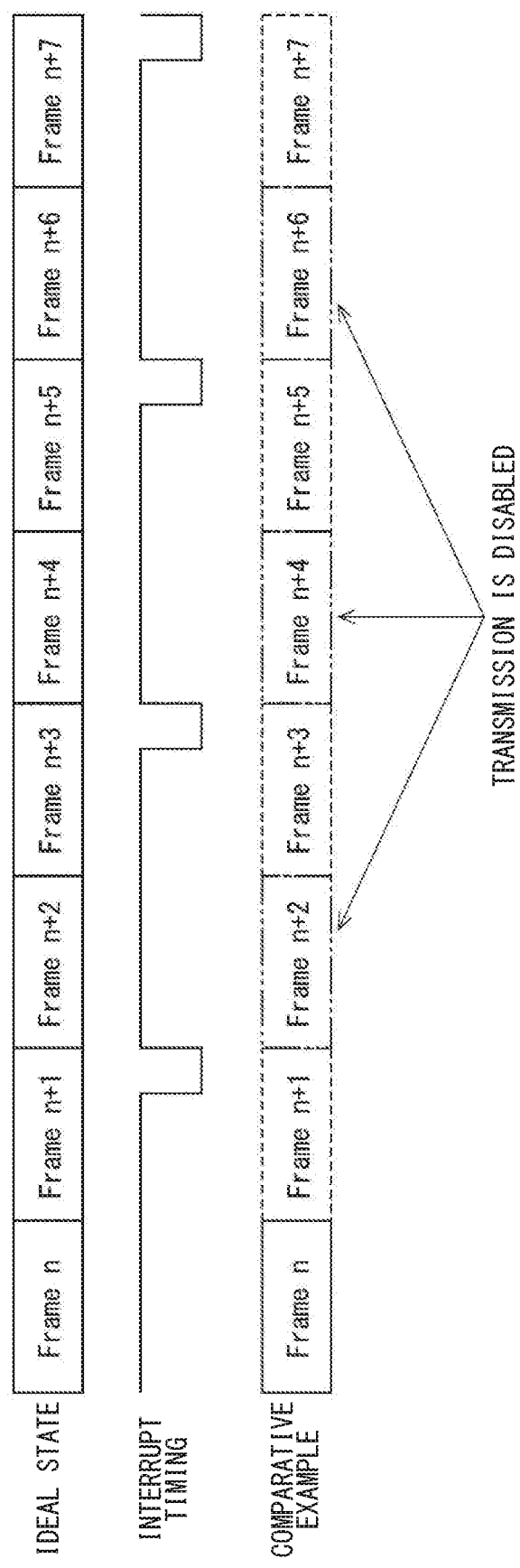

COMMUNICATION APPARATUS

CROSS REFERENCE TO RELATED APPLICATIONS

The present application is a continuation application of International Patent Application No. PCT/JP2018/038823 filed on Oct. 18, 2018, which designated the U.S. and claims the benefit of priority from Japanese Patent Application No. 2017-207051 filed on Oct. 26, 2017. The entire disclosures of all of the above applications are incorporated herein by reference.

TECHNICAL FIELD

The present disclosure relates to a communication apparatus.

BACKGROUND

There is known a technique for performing a predetermined process when detecting an instantaneous power interruption in a communication apparatus that transmits a sensor detection value (hereinafter referred to as "sensor value"). For example, a position detection apparatus is disclosed which stores an output value of a flip-flop circuit in a memory after processing a signal output from a sensor by a DSP in a regular operation mode. When a monitor circuit detects an instantaneous power interruption mode, the monitor circuit cuts off a signal path in the regular operation mode. The signal in the memory is converted into an analog signal by a D/A conversion circuit and transmitted to an external control apparatus. When a predetermined time has elapsed since the power was restored, the instantaneous power interruption mode is returned to the regular operation mode. The control apparatus that receives position information controls an operation of an in-vehicle actuator based on the received position information.

SUMMARY

According to a first example of the present disclosure, a communication apparatus operates with a supply voltage of a power and transmits a sensor value with a digital communication method using consecutive frames. In the communication apparatus, a data source unit is configured to generate a frame using a data of a sensor value processed by a signal processing unit. A switching unit is configured to perform a signal switching to permit a transmission circuit to perform a re-transmission of re-transmitting a signal including the sensor value stored in a memory in response to a restoration of the power after an occurrence of an instantaneous power interruption. A frame monitoring unit is configured to monitor a status of a frame transmission and determine a frame at the occurrence of the instantaneous power interruption. The sensor value to be re-transmitted is determined based on information of the frame determined by the frame monitoring unit at the occurrence of the instantaneous power interruption.

According to a second example of the present disclosure, a communication apparatus operates with a supply voltage of a power and transmits a sensor value with a digital communication method using consecutive frames. In the communication apparatus, a data source unit is configured to generate a frame using a data of a sensor value processed by a signal processing unit. A storage unit is configured to store a predetermined value that reports an occurrence of the instantaneous power interruption or is used to as an alternative value of the sensor value. A switching unit is configured to perform a signal switching to permit a transmission circuit to perform a re-transmission of re-transmitting a signal including the predetermined value stored in the storage unit.

BRIEF DESCRIPTION OF THE DRAWINGS

The objects, features, and advantages of the present disclosure will become more apparent from the following detailed description made with reference to the accompanying drawings. In the drawings:

FIG. 16 is a diagram for explaining an issue of a comparative example in a system in which instantaneous power interruptions frequently occur.

DETAILED DESCRIPTION

The following will describe a plurality of embodiments of a communication apparatus with reference to the drawings. In the plurality of embodiments, substantially the same element is denoted by the same reference sign to omit description thereof. The following first to fourth embodiments are collectively referred to as the present embodiment. The communication apparatus of the present embodiment is applied to a system that controls the operations of in-vehicle actuators such as a throttle valve, an accelerator pedal based on detection values such as position information of the actuators. The communication apparatus processes a sensor signal and transmits the processed signal to a control apparatus on the receiving side via digital communication.

First Embodiment

Figure 1:
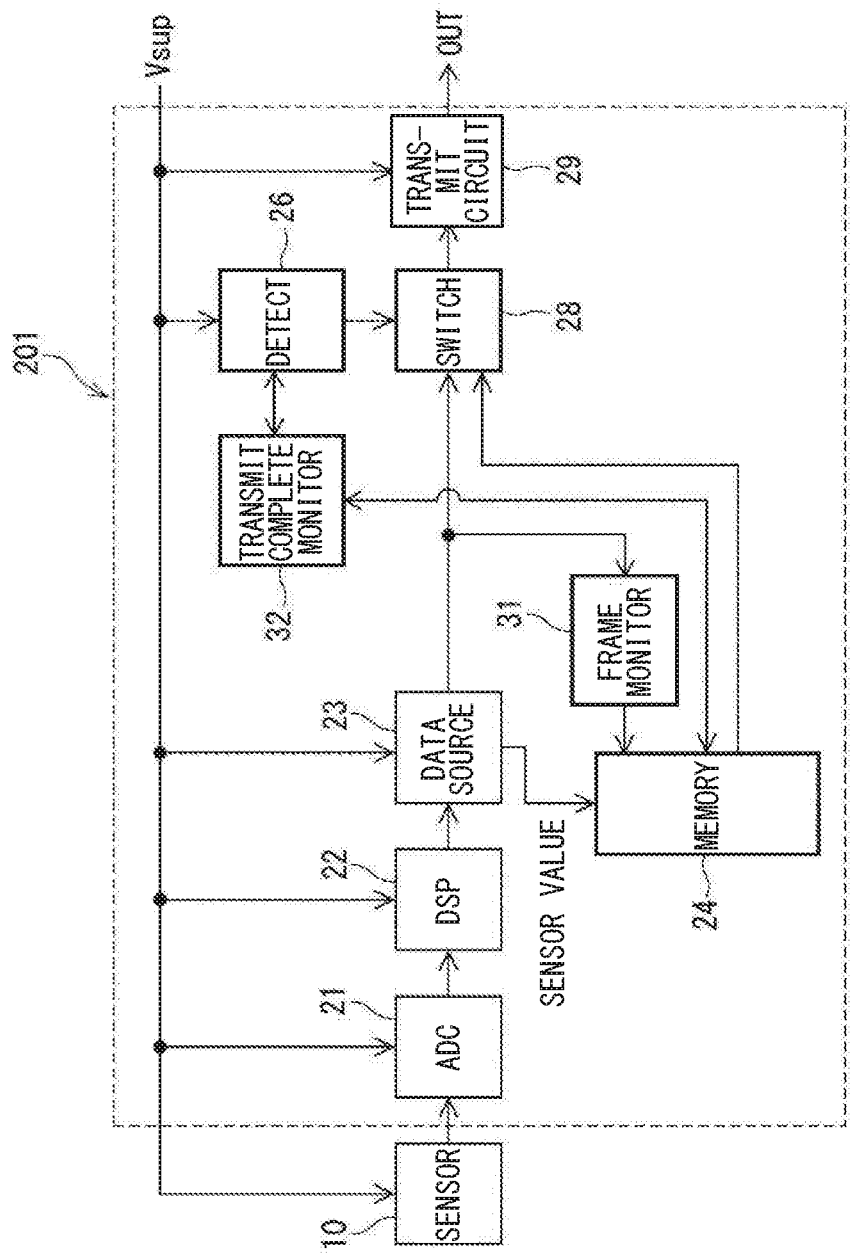
FIG. 1 is a block diagram of a communication apparatus according to a first embodiment.

A first embodiment will be described with reference to FIGS. 1 to 10. FIG. 1 shows a configuration of a communication apparatus 201 according to the first embodiment. The communication apparatus 201 processes a sensor signal input from a sensor 10 and transmits it to a receiving side apparatus (not shown). The sensor 10 can be any one of sensors for temperature, pressure, flow rate, acceleration, humidity, infrared ray, and light, and a magnetic sensor such as a Hall element or a magnetoresistive element. A power supply voltage Vsup is supplied to the sensor 10 and the individual blocks of the communication apparatus 201. Although not shown, the power supply circuit for supplying the power supply voltage Vsup includes a Zener diode and a capacitor, similar to the configuration disclosed in FIG. 2 of JP 2013-108884 A, the entire contents of which are incorporated herein by reference.

The communication apparatus 201 according to the first embodiment includes an AD conversion unit 21, a signal processing circuit 22, a data source unit 23, a storage unit 24, an instantaneous power interruption detection unit 26, a switching unit 28, a transmission circuit 29, a frame monitoring unit 31, and a transmission completion monitoring unit 32. Specifically, the communication apparatus 201 is configured by an IC(s), and functionally partitioned areas as units or circuits are conceptually shown as blocks.

The AD conversion unit 21, which may also be referred to as an analog-to-digital converter or an analog-to-digital conversion circuit, converts the analog signal continuously input from the sensor 10 into a discrete digital signal at a predetermined sampling period. In FIG. 1, the AD conversion unit 21 is referred to as "ADC". When a sensor that outputs a digital signal is used, the AD conversion unit 21 may not be provided. The signal processing circuit 22 processes the signal converted by the AD conversion unit 21. In the following description and drawings, the signal processing circuit is referred to as "DSP" (i.e., digital signal processor).

The data source unit 23, which may also be referred to as a data source circuit, generates a frame for a digital communication using the data of the sensor value processed by the DSP 22. An example of a digital communication used in an in-vehicle environment may be any of CAN, LIN, SENT, PWM, SPI, I2C, PSI5, and DSI3. The present embodiment is assumed to use mainly signals compliant with the SENT communication standard (SAE-J2716).

Figure 2:
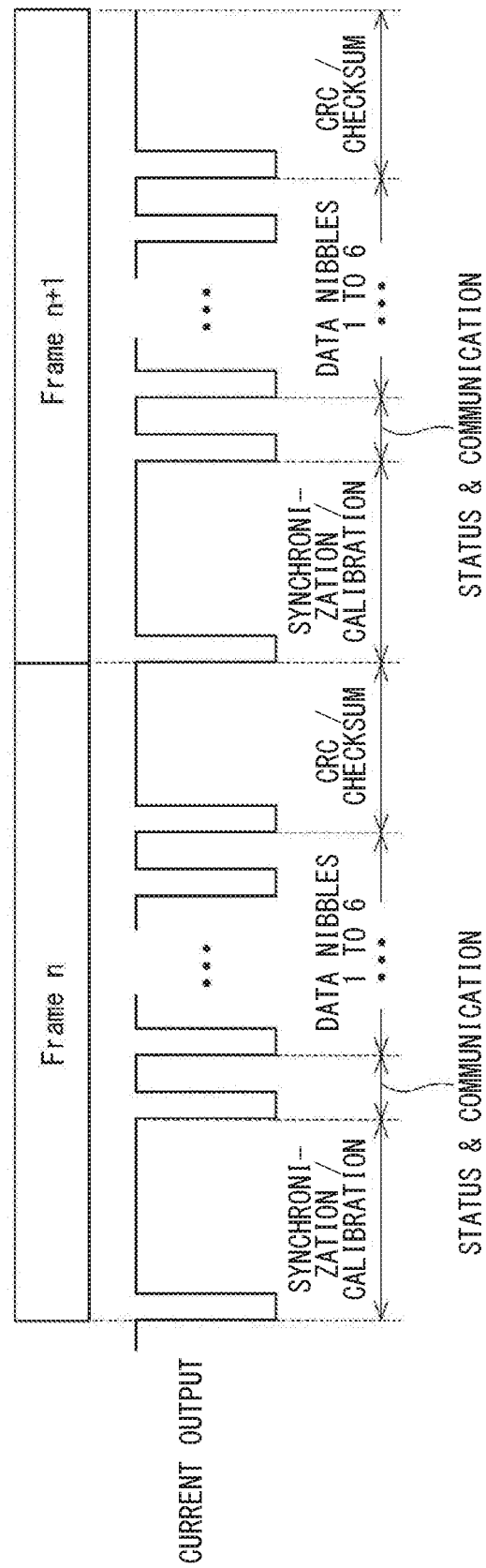
FIG. 2 is a diagram illustrating a frame structure example of a digital signal.

FIG. 2 shows an example of a frame structure according to "J2716APR2016". Each frame includes nibble signals of "synchronization/calibration", "status and communication", "data nibbles 1 to 6", and "CRC/checksum".

The storage unit 24, which may also be referred to as a storage, stores a sensor value. In the following specification and drawings, the storage unit is referred to as "memory". In contrast to a second embodiment to be described later, the memory 24 of the first embodiment stores the sensor value after the data source unit 23 generates the frame. That is, the sensor value is stored in a state where the sensor value is bundled with other signals contained in the frame.

The instantaneous power interruption detection unit 26, which may also be referred to as an instantaneous power interruption detector or an instantaneous power interruption detection circuit, detects an instantaneous power interruption that is a temporary decrease in the power supply voltage Vsup. The temporary decrease means that the power supply is restored to normal immediately, but does not mean an abnormality such as a disconnection failure which stops the power supply permanently. In FIG. 1, the instantaneous power interruption detection unit is described as "DETECT". A method for detecting an instantaneous power interruption will be described later. In addition, the stored value in the memory 24 can be prevented from being reset at the instantaneous power interruption since the power supply circuit for supplying the power supply voltage Vsup includes a Zener diode and a capacitor.

The switching unit 28, which may also be referred to as a switch or a switching circuit, receives two signals each including the sensor value from the data source unit 23 and the memory 24. The switching unit 28 switches the signals so that the signal including the sensor value stored in the memory 24 is re-transmitted when the power is restored. Note that the switching unit 28 may be provided in an area common to that of the power interruption detection unit 26. The signal selected by the switching unit 28 is input to the transmission circuit 29. The transmission circuit 29 transmits the digital signal to an outside source using the generated frame.

The frame monitoring unit 31, which may also be referred to as a frame monitor or a frame monitoring circuit, monitors the transmission status of the frame generated by the data source unit 23, and determines the frame at the time when the instantaneous power interruption occurs. The frame monitoring method will be described later. The transmission completion monitoring unit 32, which may also be referred to as a transmission completion monitor or a transmission completion monitoring circuit, monitors the completion of data transmission of the sensor value stored in the memory 24 at the time of retransmission after the power is restored, while communicating with the instantaneous power interruption detection unit 26 and the memory 24. As described above, in the communication apparatus 201 of the first embodiment, the sensor value to be re-transmitted is determined based on the information on the frame determined by the frame monitoring unit 31 at the time of the occurrence of the instantaneous power interruption.

Figure 3:
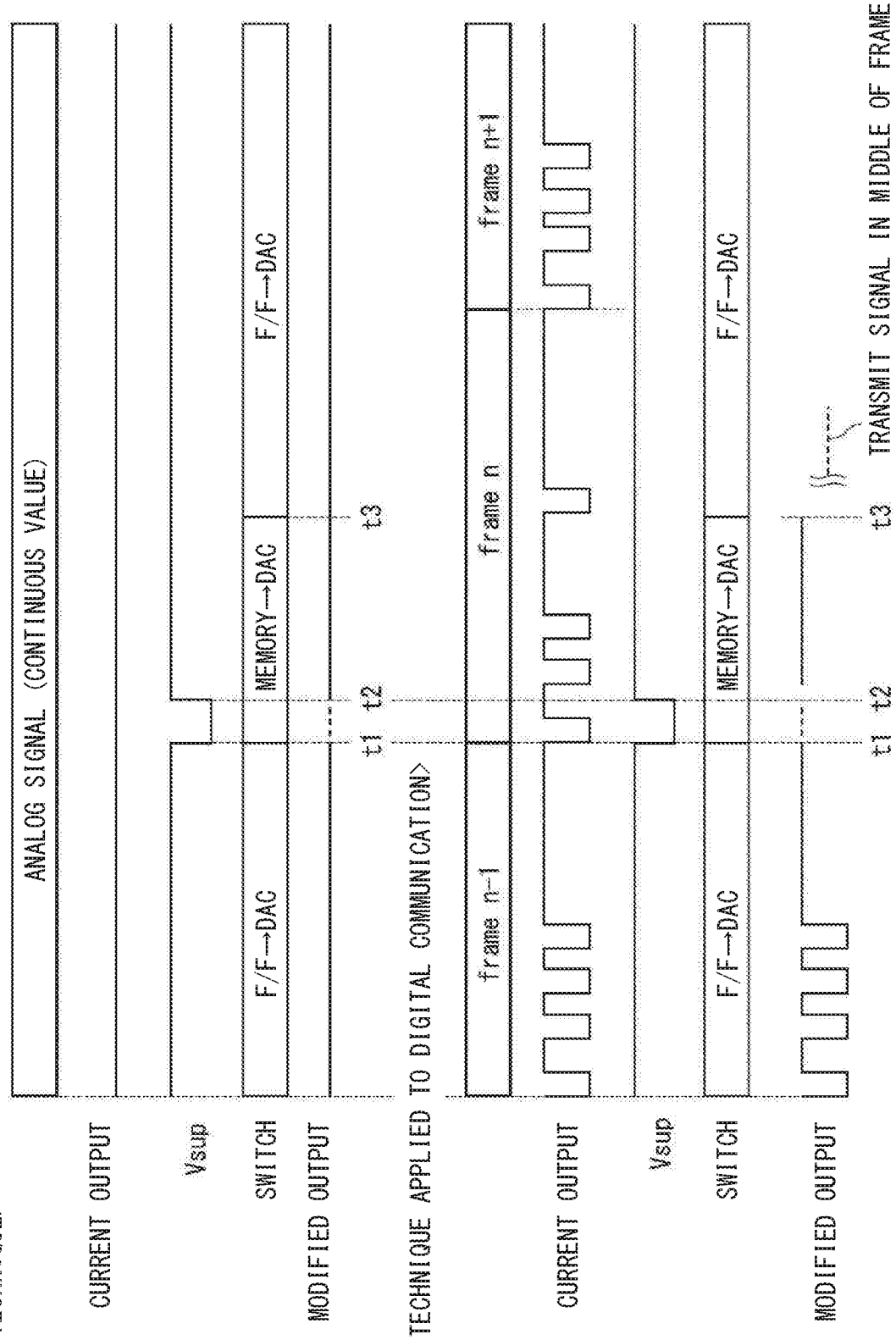
FIG. 3 is a diagram for explaining an event when a known technique for transmitting an analog signal is applied to digital communication as it is.

By the way, Patent literature 1 discloses a known technique of transmitting a signal stored in a memory in place of a regular sensor signal when an instantaneous power interruption occurs in a position detection apparatus that transmits an analog signal. Here, FIG. 3 is used to describe a case where a digital communication uses a known technique as it is. In FIG. 3, "F/F" and "DAC" respectively correspond to (i) a flip-flop circuit that stores a sensor signal in a regular state and (ii) a D/A conversion circuit that converts a digital signal into an analog signal in Patent literature 1. Note that the illustrations and notations in the frames in FIG. 3 and subsequent explanation are described in the sentence in consideration of readability. For example, "Frame n−1" in FIG. 3 is described as "Frame (n−1)" in the sentence.

In a known technique used for analog signals, an instantaneous power interruption occurs at time t1. At this time, the regular operation mode in which the F/F signal is output to the DAC is switched to the instantaneous power interruption mode in which the signal in the memory is output to the DAC. When a predetermined time has elapsed since the power restoration at time t2, the operation returns to the regular operation mode at time t3. Since the analog signal is a continuous value, the receiving side apparatus can correctly recognize the received signal regardless of the time point at which the operation returns to the regular operation mode.

However, if this known technique is used as it is for transmitting a digital signal containing consecutive frames, the signal is transmitted from the middle of frame n after returning to the regular operation mode at time t3. That is, in the known technique in Patent literature 1, since only the output voltage value at the time of the occurrence of the instantaneous power interruption is held, it is not known which frame data is the sensor value at the time of the occurrence of the instantaneous power interruption. For this reason, the frame is not correctly generated when the power is restored, and the receiving side apparatus may erroneously recognize the received signal. Therefore, as a means for solving this issue of the known technique, the communication apparatus 201 of the first embodiment includes the frame monitoring unit 31.

Figure 4:
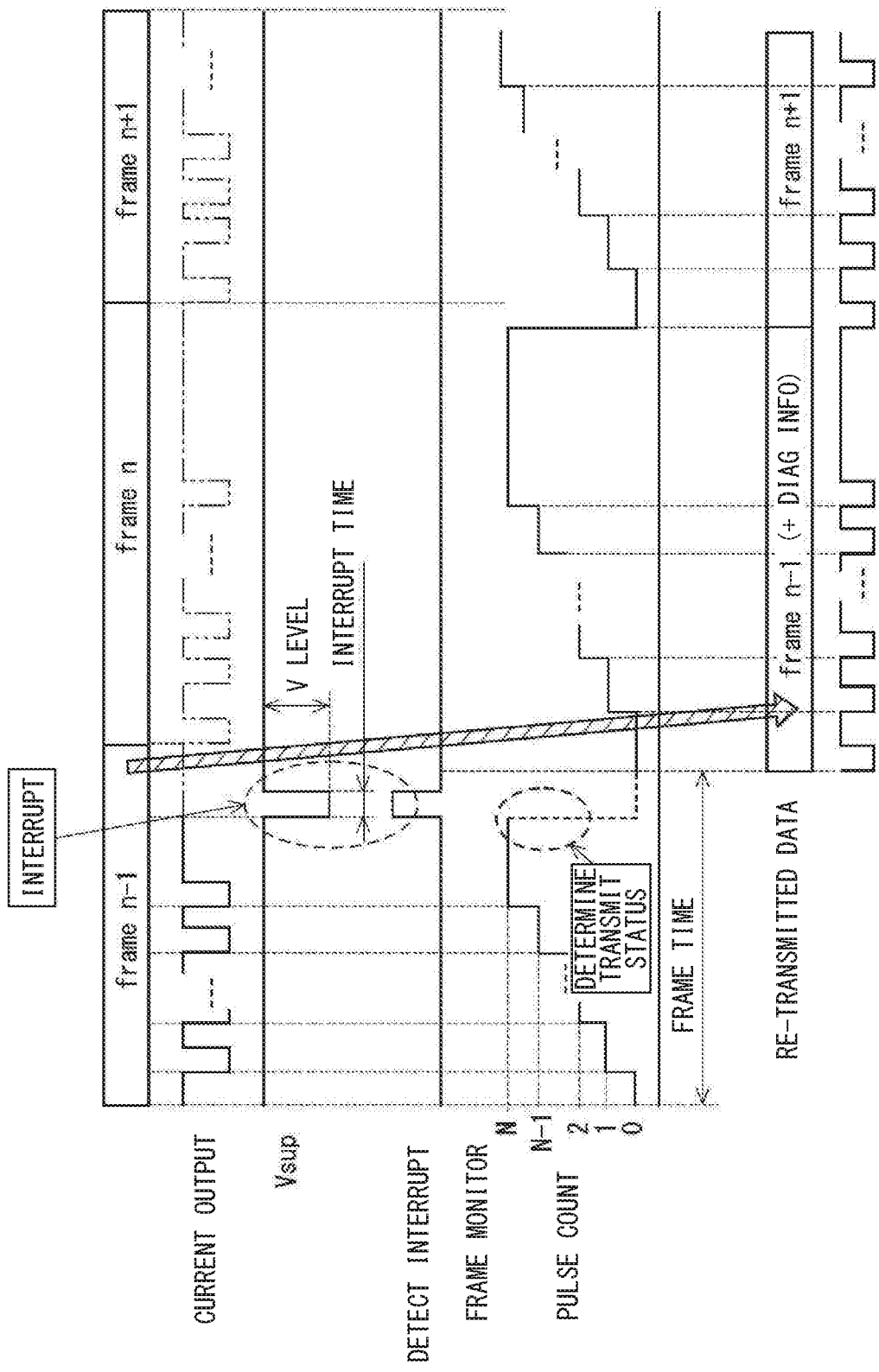
FIG. 4 is a time chart showing a signal transmission status according to the first embodiment.

Next, the operation and effect of the first embodiment will be described with reference to FIGS. 4 to 10. FIG. 4 shows a situation in which an instantaneous power interruption, which is a temporary decrease in the power supply voltage Vsup, occurs shortly before the end of frame n during transmission of a digital signal. The instantaneous power interruption detection unit 26 detects an instantaneous power interruption based on one or both of two parameters of (i) the voltage level to which the power supply voltage Vsup is decreased, and (ii) the instantaneous interruption time for which the power supply voltage Vsup is decreased.

Figure 5A:
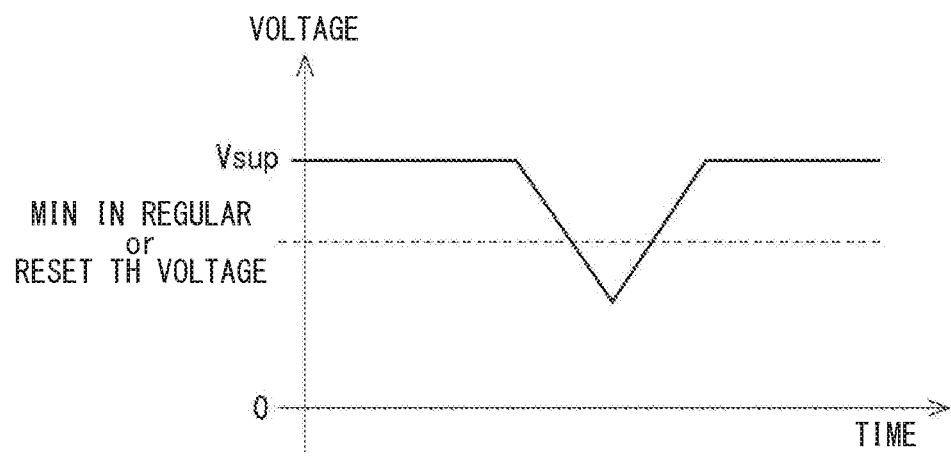
FIG. 5A is a diagram illustrating instantaneous power interruption detection based on a voltage level.

With reference to FIG. 5A, details of the instantaneous power interruption detection based on the voltage level will be described. In this method, an instantaneous power interruption is detected when the power supply voltage Vsup falls below (i) the minimum value of the regular fluctuation range or (ii) the reset threshold voltage of the sensor. If the power supply voltage Vsup is equal to or greater than the minimum value of the regular fluctuation range, instantaneous interruption should not be detected. When the voltage is equal to or greater than the reset threshold voltage of the sensor, the sensor is operating regularly; the instantaneous interruption should not be detected. By recognizing the voltage level of the instantaneous power interruption, malfunction of the instantaneous power interruption detection unit 26 can be prevented.

For example, in the SENT communication standard, 5V±0.15V including a tolerance of ±3% of the power supply voltage 5V is described as the power supply voltage standard. In this case, the instantaneous power interruption is detected at −3% or less of the power supply voltage value, that is, at 4.85 V or less. The reference value of the power supply voltage uses, in addition to 5V, a voltage such as 5V or more, 4V, 3.3V, 3V, 1.8V, less than 1.8V, or the like.

Figure 5B:
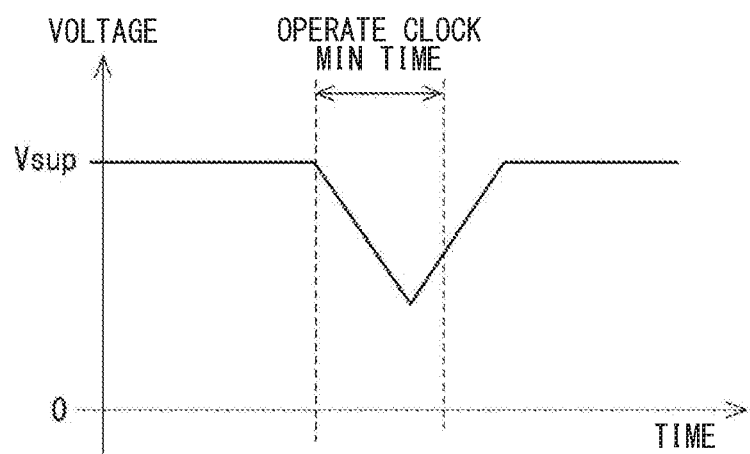
FIG. 5B is a diagram illustrating instantaneous power interruption detection based on instantaneous interruption time.

With reference to FIG. 5B, the details of the instantaneous power interruption detection based on the instantaneous interruption time will be described. In this method, the instantaneous interruption of the power supply is detected when the instantaneous interruption time of the power supply voltage Vsup is longer than the minimum operation clock of the sensor. If the instantaneous interruption time is shorter than the minimum clock in which the sensor can operate, the instantaneous interruption should not be detected. By recognizing the instantaneous interruption time of the instantaneous power interruption, malfunction of the instantaneous power interruption detection unit 26 can be prevented.

For example, when the operation clock frequency of the sensor is 1 GHz, the instantaneous interruption time for detecting the instantaneous interruption of the power supply voltage Vsup is 1 ns or more. Similarly, when the operation clock frequency is 100 MHz, a power interruption is detected in an instantaneous interruption time of 10 ns or more. When 10 MHz, 100 ns or more. When 1 MHz, 1 μs or more. When 100 kHz, 10 μs or more.

Returning to FIG. 4, the frame monitoring unit 31 monitors the transmission status of the frame (n−1) and determines that the transmission of the frame (n−1) is not completed. Therefore, at the time of re-transmission after the restoration of the power, data transmission of the sensor value is started from frame (n−1) in which transmission is in progress at the occurrence of the instantaneous power interruption and transmission has not been completed. Alternatively, the sensor value of the previous frame (n−2) or the sensor value of the frame before the previous frame (n−2) may be re-transmitted. Further, as described in parentheses, diagnostic information indicating that an instantaneous power interruption has occurred may be transmitted together.

The frame monitoring unit 31 determines the frame at the occurrence of the instantaneous power interruption based on one or both of (i) the number of pulses in one frame and (ii) the frame time, for instance. FIG. 4 shows the number of pulses that are counted based on the falling edge of the current output pulse. In this case, it can be seen that an instantaneous interruption occurred during the transmission of the Nth pulse.

Figure 6A:
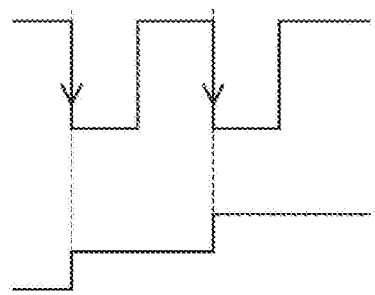
FIG. 6A is a diagram for explaining counting of the number of pulses with reference to a falling edge.
Figure 6B:
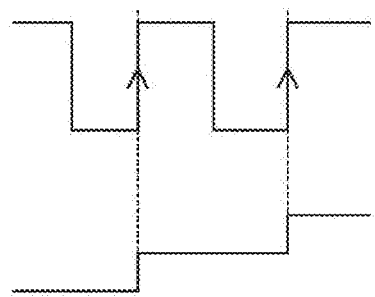
FIG. 6B is a diagram for explaining the counting of the number of pulses with reference to a rising edge.
Figure 6C:
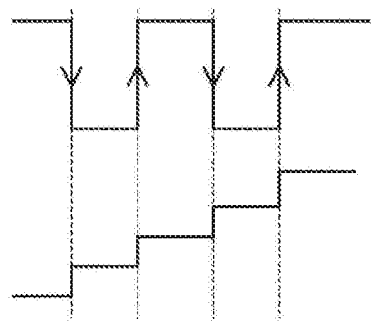
FIG. 6C is a diagram for explaining the counting of the number of pulses with reference to falling and rising edges.

The details of frame monitoring based on the number of pulses (i.e., pulse count) will be described with reference to FIGS. 6A to 6C. The method of counting the number of pulses may be any of the reference to the falling edge shown in FIG. 6A, the reference to the rising edge shown in FIG. 6B, and the reference to the rising and falling edges shown in FIG. 6C. The method of counting the number of pulsed may be used in SENT communication or the PWM where the number of pulses per frame is fixed.

An example of a specific value of the number of pulses may be the number of data nibbles being 3 to 6 in "J2716APR2016", which recommends that the number be increased to 8 in the future. Considering the number of synchronization nibbles and CRC nibbles other than data nibbles, there may be 6 to 12 pulses per frame. Therefore, it is preferable that 6 to 12 pulses can be counted in the method of counting the number of pulses.

Figure 7:
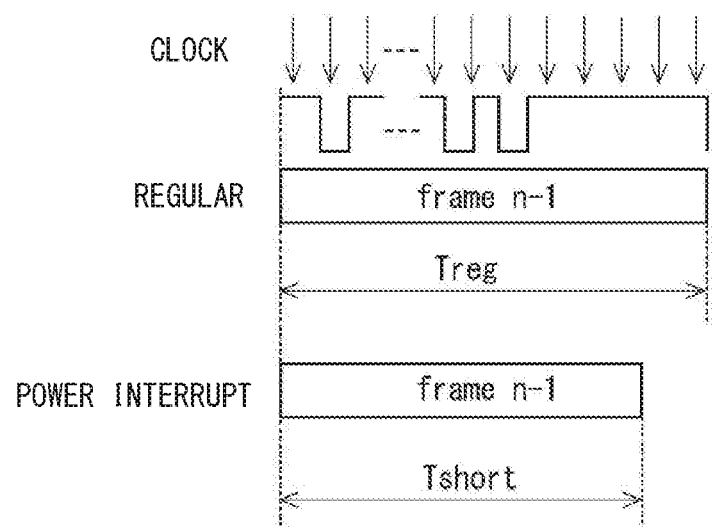
FIG. 7 is a diagram for explaining management of a frame time by clocks.

The details of frame monitoring based on the frame time will be described with reference to FIG. 7. For example, when the frame time of the frame (n−1) is Tshort that is shorter than the Treg in the regular state, it is determined that an instantaneous power interruption has occurred. The frame time may be managed using a clock. This method may be used for communication with a different number of pulses but a fixed frame time. Further, in the SENT communication standard, this method can be used by making the frame length constant using the Pause Pulse function, which is an optional function. An example of a specific value of the frame time may be variable such as the shortest being 500 to 550 μs, and the longest being 1 ms, 2 ms, and 3 ms, in "J2716APR2016". It is preferable that the communication apparatus 201 can perform time management in consideration of these times.

Figure 8:
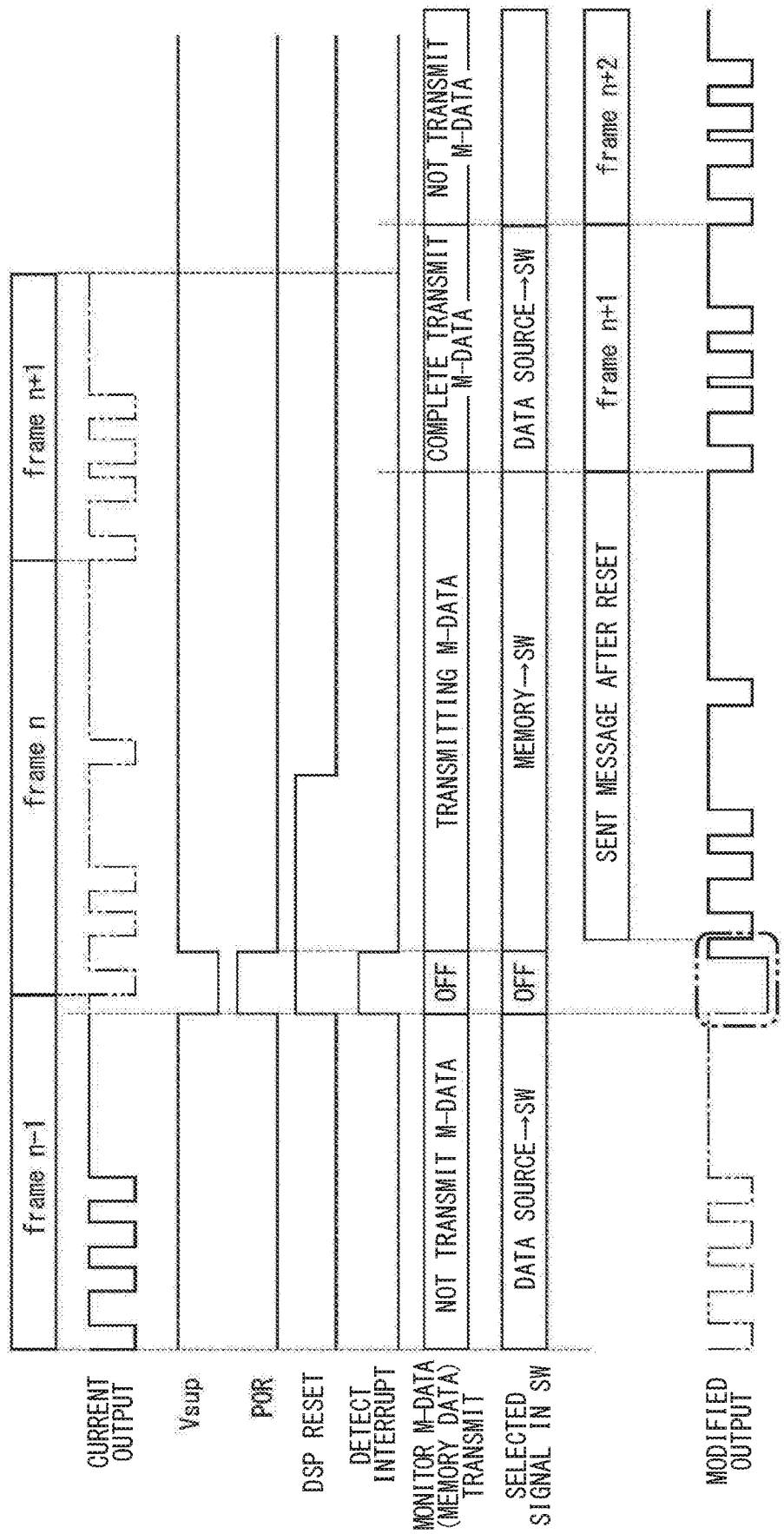
FIG. 8 is a time chart showing a signal transmission status including memory data monitoring.

Next, the operation and effect of the transmission completion monitoring unit 32 will be described with reference to FIG. 8. FIG. 8 shows POR, DSP reset, transmission completion monitoring, and selection signal of the switching unit in addition to the signals shown in FIG. 4. POR and DSP reset are at a low level in a regular state before an instantaneous power interruption occurs. The data in the memory 24 has not been transmitted, and the switching unit 28 outputs the sensor value from the data source unit 23 to the transmission circuit 29. During the detection of the instantaneous power interruption, the POR is in a high level, and the outputs of the transmission completion monitoring and switching unit are turned off. The DSP reset is at a high level from the start of the instantaneous power interruption detection to the elapse of a predetermined period after the end of the detection.

When the power is restored and the instantaneous power interruption detection ends, data retransmission starts during DSP reset. At this time, the transmission completion monitoring unit 32 monitors the data transmission status of the memory 24. During the transmission of the memory data, the switching unit 28 outputs the sensor value input from the memory 24 to the transmission circuit 29 in accordance with the flow at the instantaneous power interruption. During this period, SENT message after reset is contained in the frame. When the transmission completion monitoring unit 32 confirms the completion of the transmission of the memory data, the flow is switched from the instantaneous power interruption flow to the regular flow. Therefore, the switching unit 28 outputs the sensor value input from the data source unit 23 to the transmission circuit 29. As described above, the transmission completion monitoring unit 32 monitors the transmission status of the memory data. Thus it is possible to prevent a malfunction of switching to the regular flow in the middle of the instantaneous power interruption flow.

Next, an example of detailed data storage in the case of using the frame "J2716APR2016" shown in FIG. 2 will be supplemented. In this frame configuration, the preparation for storing data in frame (n+1) is completed during frame n. Even if instantaneous interruption occurs at any time during transmission of frame (n+1), the frame ((n+1) data can be thus re-transmitted. At the latest, before transmitting the data nibble of the frame (n+1), it is necessary to complete the preparation for transmitting the data of the frame (n+1).

However, if an instantaneous interruption occurs during transmission of "Status and Communication" or "Synchronization/Calibration" of frame (n+1), data of frame (n+1) may not be ready for transmission. In some cases, data of frame (n+1) may not be re-transmitted. In this case, the data of frame n may be re-transmitted. This process can be handled by the frame monitoring unit 31 by clarifying the preparation completion time for the data storage in advance.

Further, when re-transmitting the sensor value, the transmission circuit 29 may transmit information such as diagnostic information indicating that an instantaneous power interruption has occurred to the receiving side in addition to the data of the sensor value. The information on the occurrence of the instantaneous power interruption may be contained, for example, in the "status and communication" nibble, or may be contained in either the channel 1 (data nibbles 1 to 3) or the channel 2 (data nibbles 4 to 6) of the data nibble. This enables the receiving side to recognize the reason why the data is temporarily lost due to the instantaneous power interruption. The excessive measures against abnormalities are avoided, and the reliability of the system is improved.

Figure 9:
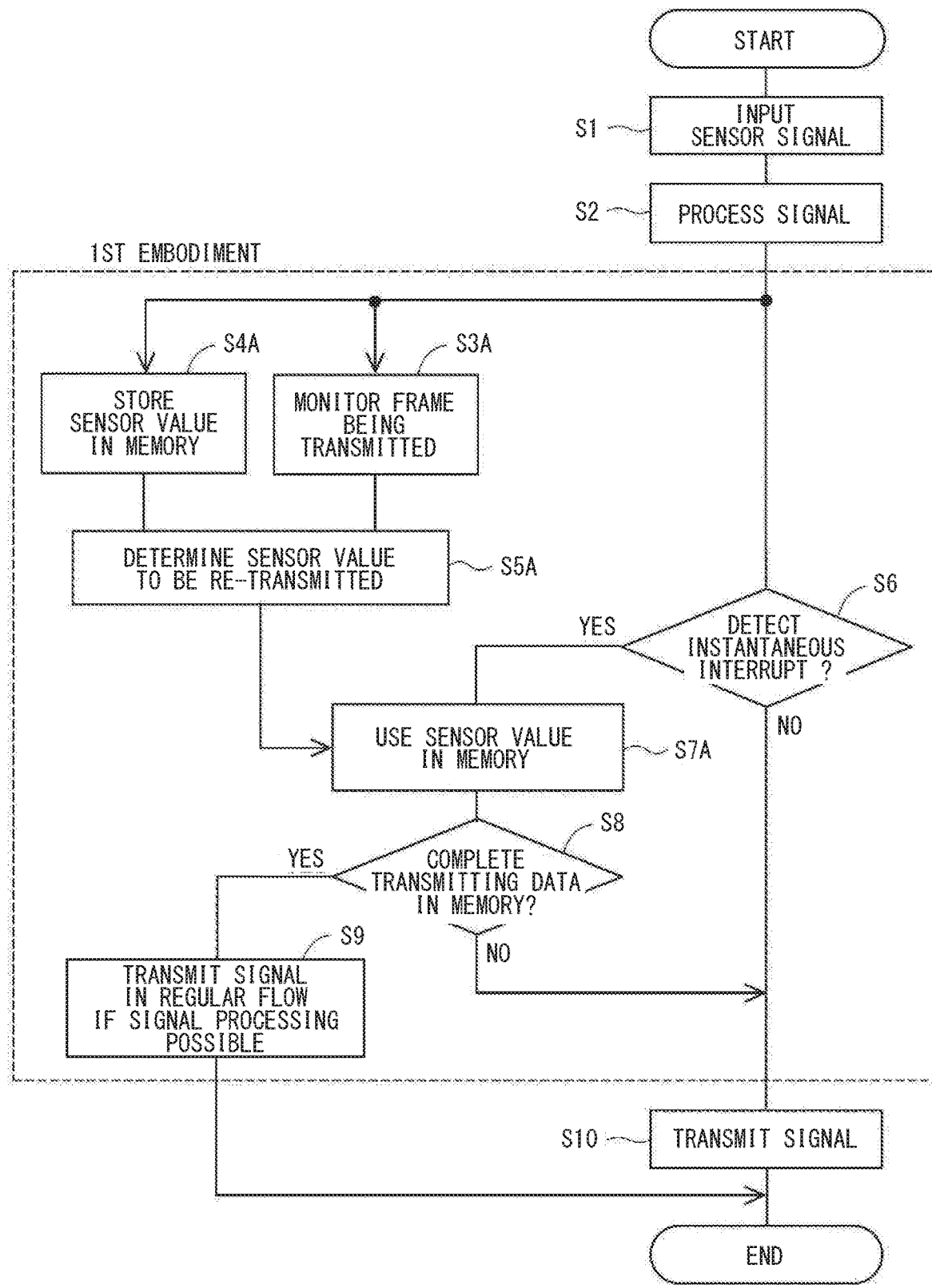
FIG. 9 is a diagram for explaining the effect of the first embodiment in a system in which instantaneous power interruptions frequently occur.

Next, the processing of the first embodiment is shown in the flowchart of FIG. 9. In the description of the flowchart, the symbol "5" indicates a step. Steps in which symbols are only numerals are steps common to the processing of the fourth embodiment shown in FIG. 15, and steps suffixed with "A" are steps unique to the first embodiment. Further, the steps surrounded by a broken line is the processing different from the known technique.

In S1, the AD conversion unit 21 receives a sensor signal from the sensor 10. In S2, the DSP 22 performs signal processing. In addition, the data source unit 23 generates a frame including the data of the sensor value. In S3A, the frame monitoring unit 31 monitors the frame being transmitted. In S4A, the memory 24 stores the sensor value input from the data source unit 23. In S5A, a sensor value to be re-transmitted is determined based on the frame monitoring.

In S6, it is determined whether or not the instantaneous power interruption detection unit 26 detects the instantaneous power interruption. When the instantaneous power interruption is not detected and NO is determined in S6, the process proceeds to S10, where the transmission circuit 29 transmits a signal. On the other hand, when an instantaneous power interruption is detected and YES is determined in S6, the switching unit 28 performs the signal switching so as to use the sensor value stored in the memory 24 as transmission data in S7A.

In S8, the transmission completion monitoring unit 32 determines whether the data in the memory 24 has been transmitted. If NO, that is, if transmission has not been completed, the process proceeds to S10, and the transmission circuit 29 transmits a signal. If YES, that is, if the transmission has already been completed, the process proceeds to S9. In S9, if signal processing is possible, the transmission circuit 29 transmits a signal in a regular flow.

Next, with reference to FIG. 10 and FIG. 16, an effect of the first embodiment in a system in which an instantaneous power interruption frequently occurs will be described in comparison with a comparative example. It is assumed that in an ideal state, an instantaneous power interruption occurs every two frames during eight consecutive frames from frame n to frame (n+7). The transmission data of the frame (n+1), the frame (n+3), the frame (n+5), and the frame (n+7) surrounded by the broken lines are lost due to the instantaneous power interruption.

In the comparative example shown in FIG. 16, signal transmission is disabled, due to the IC being reset, in the frame (n+2), frame (n+4), and frame (n+6) surrounded by the two-dot chain lines following the frame in which the instantaneous power interruption occurs. Therefore, transmission of data from frame (n+1) to frame (n+7) is interrupted, and the receiving side apparatus falls into a state where it is not possible to execute a control operation.

Figure 10:
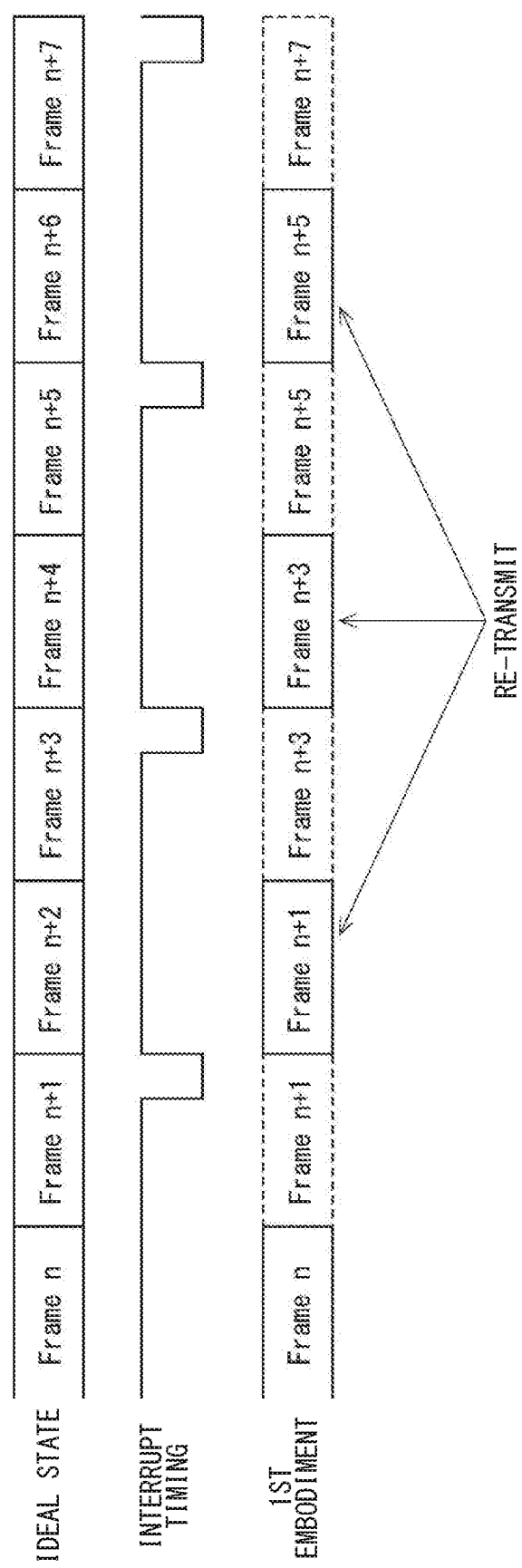
FIG. 10 is a diagram showing a signal transmission situation at an occurrence of an instantaneous power interruption according to the first embodiment.

On the other hand, in the first embodiment shown in FIG. 10, the signal can be transmitted during the IC reset, and the frames (n+1), (n+3), and (n+5) in which the instantaneous power interruption occurs, as surrounded by the solid lines, can be immediately re-transmitted after an instantaneous power interruption. Therefore, the receiving side apparatus can execute the control operation under almost the same conditions as in the situation where no instantaneous power interruption occurs. As described above, the first embodiment is particularly effective in a system in which instantaneous power interruption frequently occurs. For example, in the case of a communication apparatus mounted on a vehicle, there is a possibility that instantaneous power interruptions may occur relatively frequently. It is thus effective to apply the first embodiment.

As described above, in the communication apparatus 201 of the first embodiment, the frame monitoring unit 31 monitors the transmission status of the frame, and determines the frame at the occurrence of the instantaneous power interruption. When the data is re-transmitted after the power is restored, the frame can be generated appropriately.

Therefore, the receiving side apparatus can correctly recognize the sensor value of the re-transmitted signal. This configuration can prevent an excessive measure against abnormality from being performed.

Second Embodiment

Figure 11:
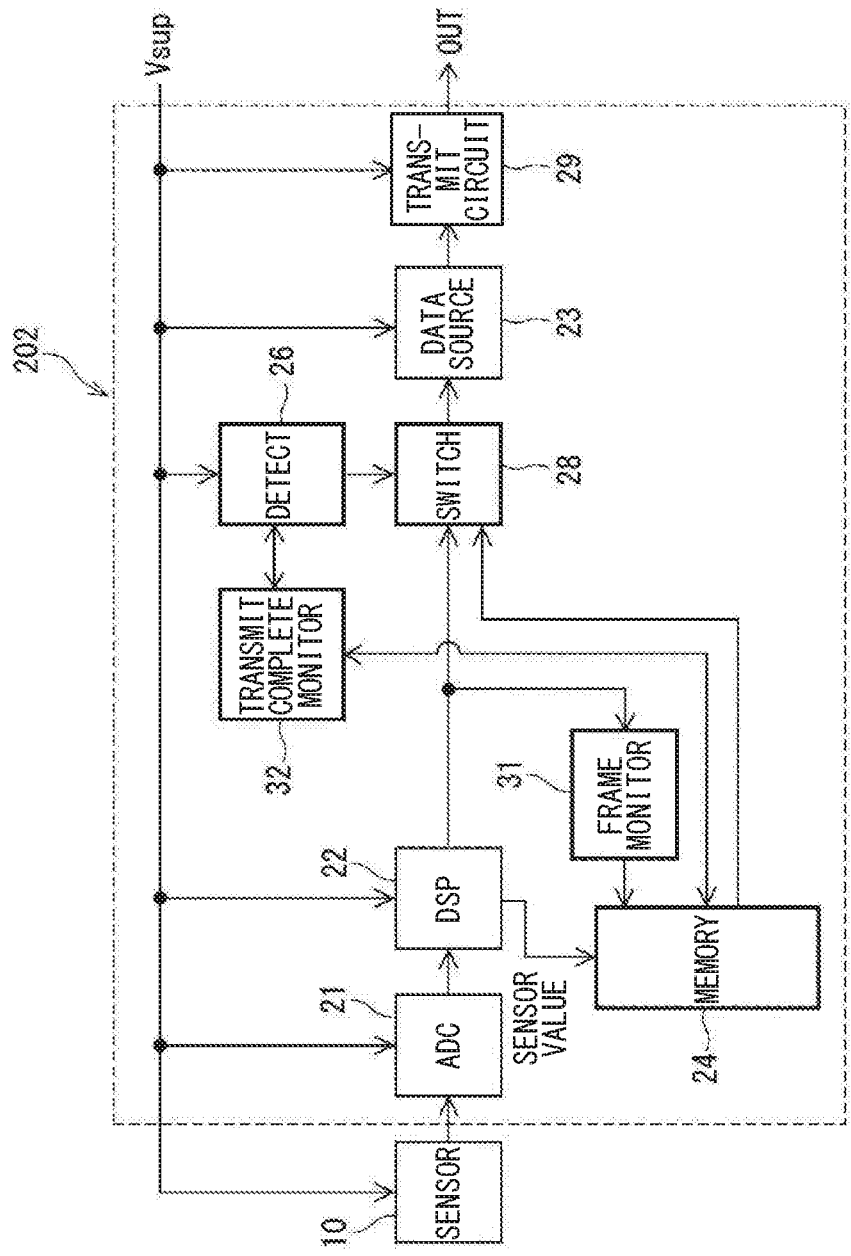
FIG. 11 is a block diagram of a communication apparatus according to a second embodiment.

A second embodiment will be described with reference to FIG. 11. The communication apparatus 202 according to the second embodiment is different from the first embodiment in that the data source unit 23 is disposed between the switching unit 28 and the transmission circuit 29, and the data by the DSP 22 is stored in the memory 24. In this configuration, the memory 24 stores the sensor value after the processing by the DSP 22 and before the frame generation by the data source unit 23.

Regularly, the switching unit 28 sequentially outputs the signals processed by the DSP 22 to the data source unit 23. The data source unit 23 generates a frame using the new sensor value and outputs the frame to the transmission circuit 29. On the other hand, at the restoration of the power after an instantaneous power interruption, the switching unit 28 outputs the sensor value stored in the memory 24 to the data source unit 23. The data source unit 23 uses the sensor value stored in the memory 24 to generate a frame of the signal to be re-transmitted.

Other configurations such as the frame monitoring unit 31, the transmission completion monitoring unit 32, and the like are the same as those of the first embodiment. Therefore, in the second embodiment, similarly to the first embodiment, it is possible to monitor the frame containing the sensor signal at the occurrence of the instantaneous power interruption and to re-transmit an appropriate signal when the power is restored. In addition, if the memory 24 stores the signal after the frame is generated, the common signal other than the data area, such as status and CRC, is stored together. Thus, the storage capacity is increased. In contrast, the second embodiment is configured to store only the sensor value before the frame is generated; thus, the storage capacity can be reduced.

Third Embodiment

Figure 12:
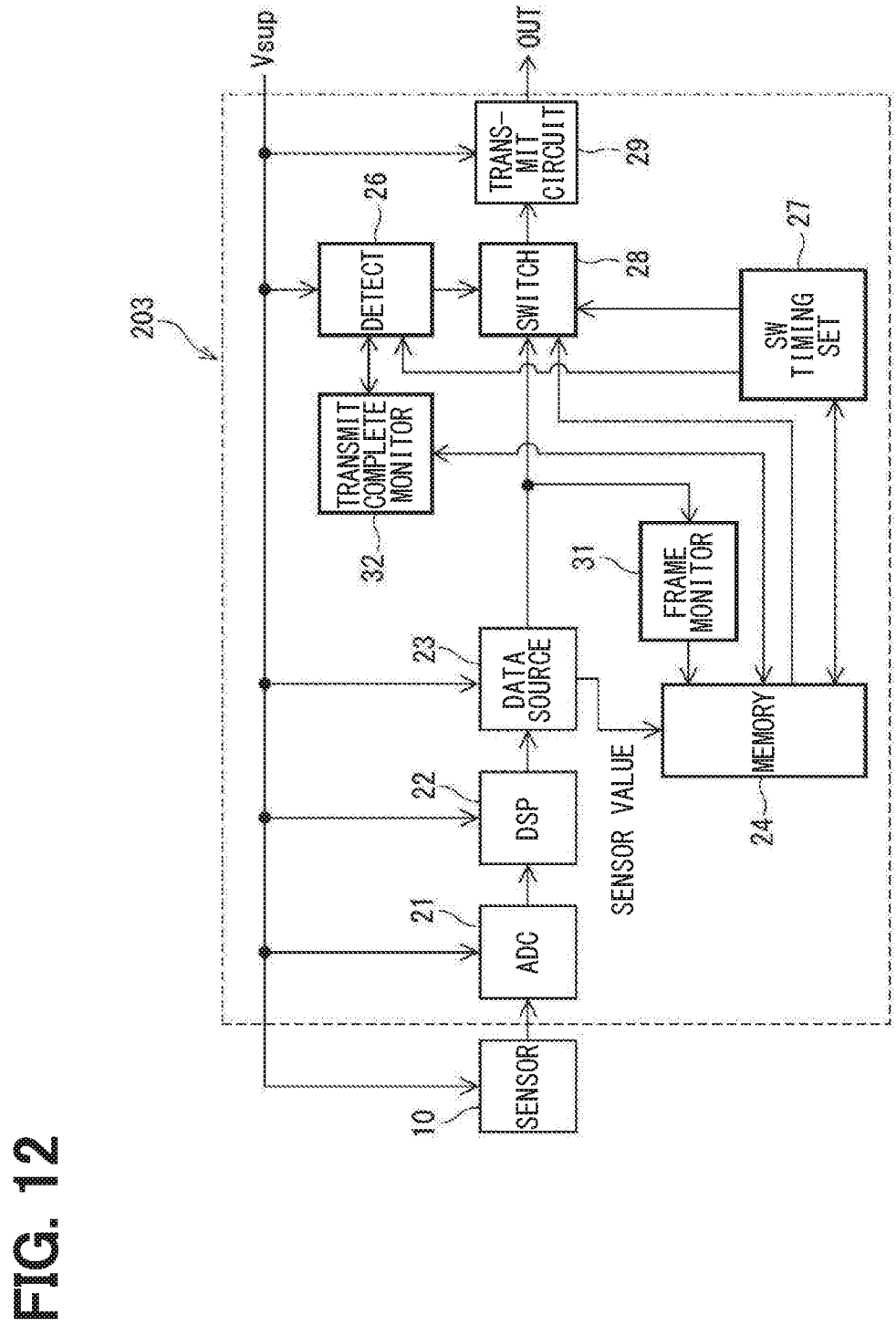
FIG. 12 is a block diagram of a communication apparatus according to a third embodiment.

A third embodiment will be described with reference to FIGS. 12 and 13. Contrary to the first embodiment, the communication apparatus 203 according to the third embodiment further includes a switching timing setting unit 27 that can adjust the switching timing of the signal by the switching unit 28. The switching timing setting unit 27, which may also be referred to as a switching timing setting circuit, exchanges information with the instantaneous power interruption detection unit 26 and the memory 24. Further, the timing set by the switching timing setting unit 27 is notified to the switching unit 28.

Figure 13:
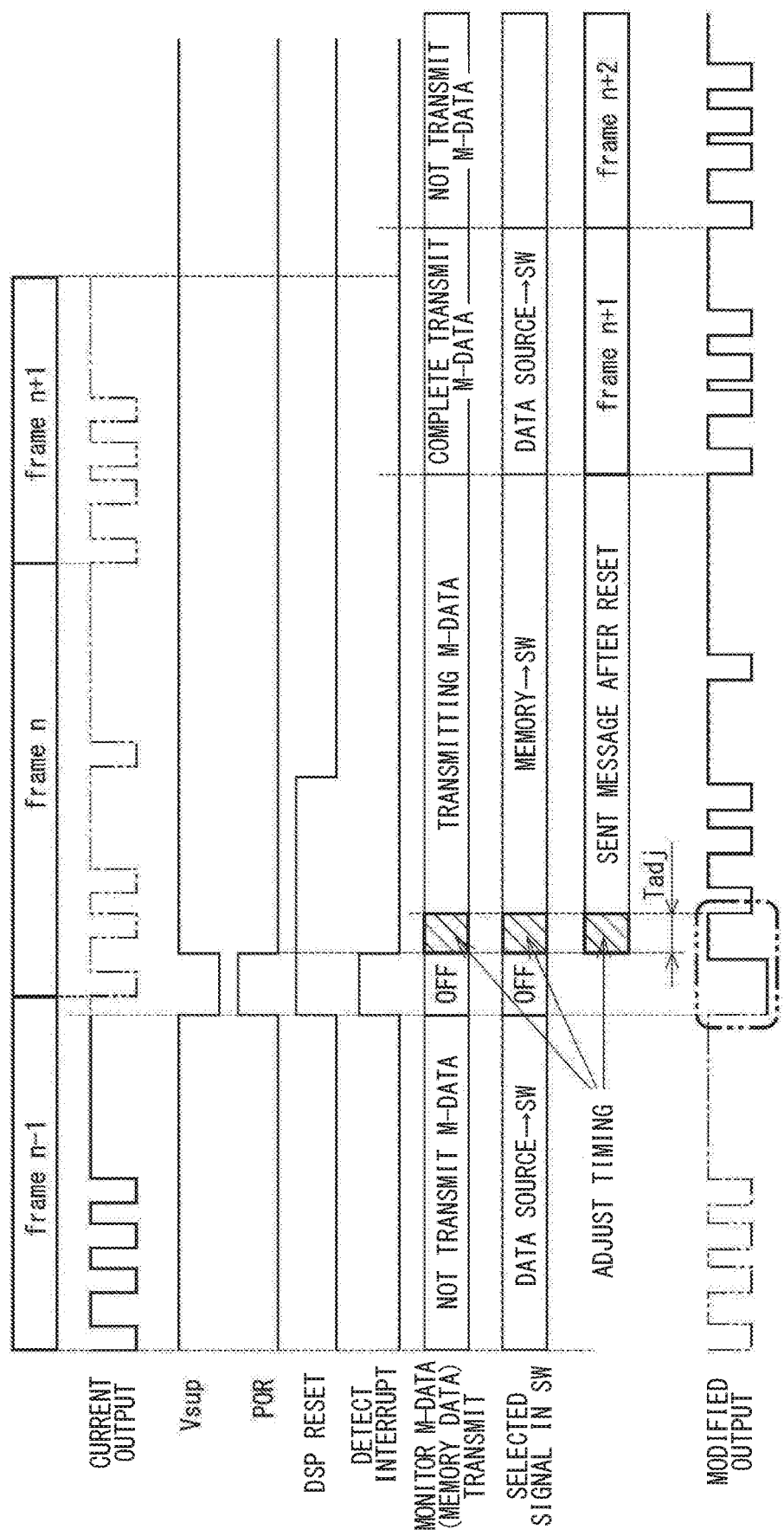
FIG. 13 is a time chart showing a signal transmission situation including switching timing setting.

As shown in FIG. 13, re-transmission is started after the adjustment time Tadj from the time when the power is restored; the adjustment time Tadj is set by the switching timing setting unit 27. As described above, the third embodiment can change the re-transmission start timing as needed; this can widen the range of interface compatibility between the transmission side and the reception side.

Fourth Embodiment

A fourth embodiment will be described with reference to FIGS. 14 and 15. The communication apparatus 204 of the fourth embodiment is different from the first to third embodiments in that a memory 25 for storing a predetermined value is provided, instead of the memory 24 for storing a sensor value inputted each time. The communication apparatus 204 according to the fourth embodiment does not include the frame monitoring unit 31. The switching unit 28 switches the signals so that the transmission circuit 29 re-transmits the signal including the predetermined value stored in the memory 25 when the power is restored. The transmission circuit 29 transmits a signal including a predetermined value during the IC reset. The transmission completion monitoring unit 32 monitors the completion of the data transmission of the predetermined value stored in the memory 25 at the time of re-transmission after the power is restored.

Figure 14:
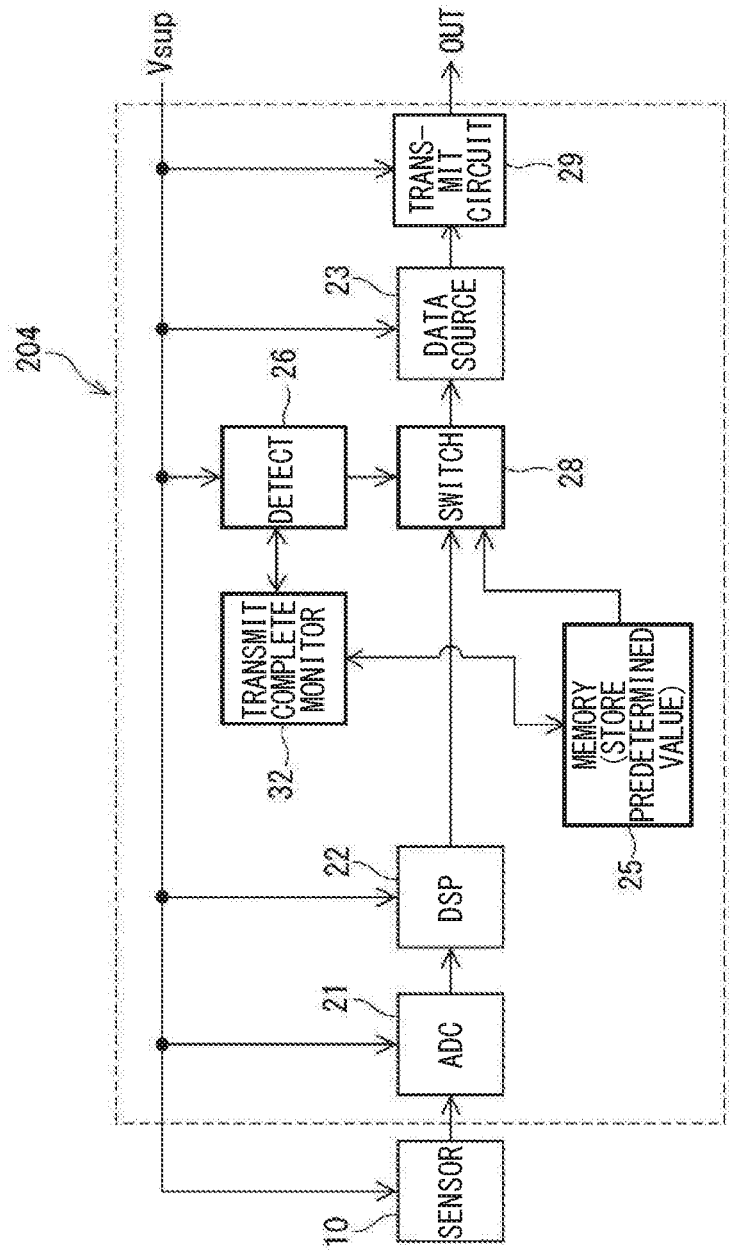
FIG. 14 is a block diagram of a communication apparatus according to a fourth embodiment.

In the configuration example of FIG. 14, the data source unit 23 is provided after the switching unit 28 as in the second embodiment. That is, the data source unit 23 generates a frame based on the predetermined value input to the switching unit 28. Other than that, the method of detecting the instantaneous power interruption by the instantaneous power interruption detection unit 26 is the same as that of the first embodiment. Further, a switching timing setting unit 27 may be provided as in the third embodiment.

Figure 15:
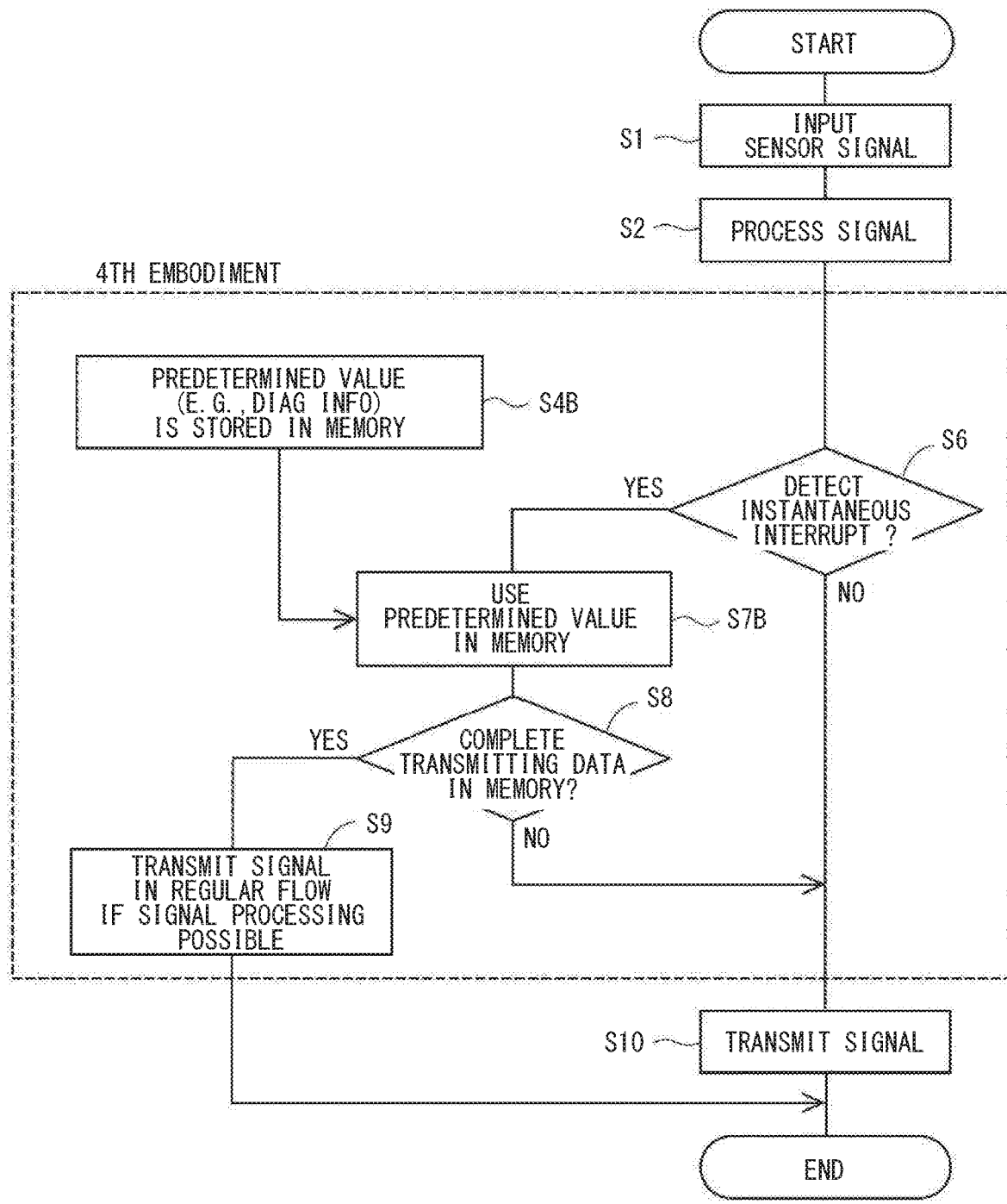
FIG. 15 is a flowchart of a signal transmission process according to the fourth embodiment.

In the flowchart of FIG. 15, S3A and S5A are not included in FIG. 9, and S4B is executed instead of S4A. Also, S7B is executed instead of S7A. The other steps are substantially the same as those in FIG. 9. In S4B, a predetermined value has been stored in the memory 25. The timing for the storage may be at the time of manufacturing the apparatus, or the storage may be updated according to the operating environment at the time of starting the system. When an instantaneous power interruption is detected and YES is determined in S6, the switching unit 28 switches to use the predetermined value stored in the memory 25 as a transmission data in S7B.

The following values are used as examples of the predetermined value. (1) A diagnostic value that indicates that a power interruption has occurred. (2) Any default value. For example, according to the SENT communication standard (SAEJ2716), the transmission signal value after reset may transmit a value "0" as an initial value. (3) A value recommended by communication standards. (4) A transmission value determined between the signal transmitting side and the signal receiving side. Here, it is preferable that the values of (2), (3), and (4) be values that can be used by the receiving side apparatus as a substitute value for the sensor value.

For example, the receiving side apparatus receives the diagnostic value, recognizes that the power supply has been restored after an instantaneous power interruption (i.e., that the power interruption is not a permanent abnormality), and determines that the measure against abnormality is unnecessary. Alternatively, by receiving a value that can be used as a substitute value for the sensor value, the receiving side apparatus can continue control of, for example, the operation of the in-vehicle actuator based on the received value. Therefore, it is possible to avoid performing excessive measures against abnormalities; this leads to improvement in the reliability of the system. As described above, the fourth embodiment can achieve the same object as that of the first to third embodiments by a configuration different from those of the first to third embodiments.

Other Embodiments

The communication apparatus according to the present disclosure is not limited to a system that controls the operation of an in-vehicle actuator, and can be applied to any system that transmits a digital signal by a communication method including consecutive frames in an environment where a power interruption may occur. Further, the digital communication system is not limited to the communication system used in the vehicle environment.

As described above, the present disclosure is not limited to the embodiments described above, and can be practiced in various aspects without departing from the essence of the present disclosure.

The present disclosure has been described according to the embodiments.

However, the present disclosure is not limited to such embodiments and configurations. The present disclosure also encompasses various modification examples and variations within the scope of equivalents. In addition, various combinations and forms, and other combinations and forms including only one element, more or less, are within the scope and spirit of the present disclosure.

For reference to further explain features of the present disclosure, the description is added as follows.

There is known a technique for performing a predetermined process when detecting an instantaneous power interruption in a communication apparatus that transmits a sensor detection value (hereinafter referred to as "sensor value"). For example, a position detection apparatus is disclosed which stores an output value of a flip-flop circuit in a memory after processing a signal output from a sensor by a DSP in a regular operation mode. When a monitor circuit detects an instantaneous power interruption mode, the monitor circuit cuts off a signal path in the regular operation mode. The signal in the memory is converted into an analog signal by a D/A conversion circuit and transmitted to an external control apparatus. When a predetermined time has elapsed since the power was restored, the instantaneous power interruption mode is returned to the regular operation mode. The control apparatus that receives position information controls an operation of an in-vehicle actuator based on the received position information.

The above position detection apparatus assumes the transmission using an analog signal. Such an analog signal is a continuous value. Thus, after the restoration of the power, the output voltage value held at the occurrence of the instantaneous power interruption is therefore transmitted as it is, regardless of when the instantaneous power interruption mode is returned to the regular operation mode. The receiving side apparatus can therefore correctly recognize the received signal. In contrast, suppose the case of digital signals. In this case, a series of signals is transmitted in a unit of a frame. The position detection apparatus only holds the output voltage value at the occurrence of the instantaneous power interruption. This does not indicate the frame that corresponds to the sensor value at the occurrence of the instantaneous power interruption. For this reason, the frame is not correctly generated when the power supply is restored. The receiving side apparatus may therefore erroneously recognize the received signal. This leads to a situation that needs to take excessive measures against abnormalities from a fail-safe perspective. For instance, when the instantaneous power interruption occurs, the receiving side apparatus determines that the operation of the actuator is in an uncontrollable state even though it returns to the regular state immediately. The control is thus switched to the evacuation traveling as the measures against the abnormality.

It is thus desired to provide a communication apparatus that transmits a sensor value as a digital signal while avoiding excessive measures against abnormalities on a receiving side when an instantaneous power interruption occurs.

The present disclosure relates a communication apparatus that operates with a supply voltage of a power and transmits a sensor value with a digital communication method including consecutive frames.

Aspects of the present disclosure described herein are set forth in the following clauses.

According to a first aspect of the present disclosure, a communication apparatus is provided to include a signal processing circuit, a data source unit, a transmission circuit, a power supply interruption detection unit, a storage unit, a switching unit, a frame monitoring unit, and a transmission completion monitoring unit. The signal processing circuit processes a signal input from the sensor. The data source unit generates a frame using a data of the sensor value processed by the signal processing circuit. The transmission circuit transmits a digital signal to an outside source using a generated frame. The instantaneous power interruption detection unit detects an instantaneous power interruption that is a temporary decrease in the supply voltage of the power.

The storage unit stores the sensor value. The switching unit performs a signal switching so that the transmission circuit performs a re-transmission of re-transmitting a signal including the sensor value stored in the storage unit in response to a restoration of the power after the instantaneous power interruption. The frame monitoring unit monitors a status of a frame transmission and determines a frame at an occurrence of the instantaneous power interruption. The transmission completion monitoring unit monitors a completion of a data transmission of the sensor value stored in the storage unit at the re-transmission in response to the restoration of the power. At the re-transmission in response to the restoration of the power, the sensor value to be re-transmitted is determined based on information on the frame determined by the frame monitoring unit at the occurrence of the instantaneous power interruption.

Specifically, in the re-transmission after the power is restored, this communication apparatus re-transmits the sensor value of an instant frame that was being transmitted at the occurrence of the instantaneous power interruption or a previous frame that was transmitted before the instant frame. In the communication apparatus according to the first aspect, the frame monitoring unit monitors the transmission status of the frame, and determines the frame at the occurrence of the instantaneous power interruption. This can generate a frame appropriately when data is re-transmitted after the power is restored. Therefore, the receiving side apparatus can correctly recognize the sensor value of the re-transmitted signal. Accordingly, it is possible to avoid performing excessive measures against abnormalities.

According to a second aspect of the present disclosure, a communication apparatus is provided to include a signal processing circuit, a data source unit, a transmission circuit, a power supply interruption detection unit, a storage unit, a switching unit, and a transmission completion monitoring unit. The signal processing circuit, the data source unit, the transmission circuit, and the power supply interruption detection unit are the same as those in the first aspect.

The storage unit is configured to store a predetermined value that reports an occurrence of the instantaneous power interruption or is used to as an alternative value of the sensor value. The switching unit performs a signal switching to permit the transmission circuit to perform a re-transmission of re-transmitting a signal including the predetermined value stored in the storage unit. The transmission completion monitoring unit monitors a completion of data transmission of the predetermined value stored in the storage unit at the re-transmission in response to the restoration of the power.

In the communication apparatus according to the second aspect, the receiving side apparatus can receive the predetermined value after the power is restored and appropriately process the received data by recognizing that the instantaneous power interruption has occurred. Alternatively, the receiving side apparatus can perform calculation processing in the same manner as in a regular state by using the predetermined value as an alternative value of the sensor value. Accordingly, it is possible to avoid performing excessive measures against abnormalities.

What is claimed is:

1. A communication apparatus that operates with a supply voltage of a power and transmits a sensor value with a digital communication method using consecutive frames, comprising:
    a signal processing circuit configured to process as a sensor value a signal input from a sensor;
    a data source unit configured to generate a frame using a data of the sensor value processed by the signal processing circuit;
    a transmission circuit configured to transmit a digital signal to an outside source by using a generated frame;
    an instantaneous power interruption detection unit configured to detect an instantaneous power interruption that is a temporary decrease in the supply voltage of the power;
    a storage unit configured to store the sensor value;
    a switching unit configured to perform a signal switching to permit the transmission circuit to perform a re-transmission of re-transmitting a signal including the sensor value stored in the storage unit in response to a restoration of the power after the instantaneous power interruption;
    a frame monitoring unit configured to monitor a status of a frame transmission and determine a frame at an occurrence of the instantaneous power interruption; and
    a transmission completion monitoring unit configured to monitor a completion of data transmission of the sensor value stored in the storage unit at the re-transmission in response to the restoration of the power,
    wherein
    the sensor value to be re-transmitted is determined based on information of the frame determined by the frame monitoring unit at the occurrence of the instantaneous power interruption.

2. The communication apparatus according to claim 1, wherein
    the frame monitoring unit is configured to determine an instant frame at the occurrence of the instantaneous power interruption based on a pulse count in one frame.

3. The communication apparatus according to claim 1, wherein
    the frame monitoring unit is configured to determine an instant frame at the occurrence of the instantaneous power interruption based on a time of a frame.

4. The communication apparatus according to claim 1, wherein
    the instantaneous power interruption detection unit is configured to detect the instantaneous power interruption based on a voltage level to which the supply voltage of the power is decreased.

5. The communication apparatus according to claim 1, wherein
    the instantaneous power interruption detection unit is configured to detect the instantaneous power interruption based on a period of time of the instantaneous power interruption.

6. A communication apparatus that operates with a supply voltage of a power and transmits a sensor value with a digital communication method using consecutive frames, comprising:
    a signal processing circuit configured to process as a sensor value a signal input from a sensor;
    a data source circuit configured to generate a frame using a data of the sensor value processed by the signal processing circuit;
    a transmission circuit configured to transmit a digital signal to an outside source by using a generated frame;
    an instantaneous power interruption detection circuit configured to detect an instantaneous power interruption that is a temporary decrease in the supply voltage of the power;
    a storage communicably connected with a one of the signal processing circuit and the data source circuit, the storage being configured to store the sensor value;
    a switching circuit configured to perform a signal switching to permit the transmission circuit to perform a re-transmission of re-transmitting a signal including the sensor value stored in the storage in response to a restoration of the power after the instantaneous power interruption;
    a frame monitoring circuit connected to an output line of the one of the signal processing circuit and the date source circuit, the frame monitoring circuit being configured to monitor a status of a frame transmission and determine a frame at an occurrence of the instantaneous power interruption; and
    a transmission completion monitoring circuit communicably connected with each of the storage and the instantaneous power interruption detection circuit, the transmission completion monitoring circuit being configured to monitor a completion of data transmission of the sensor value stored in the storage at the re-transmission in response to the restoration of the power,
    wherein
    the sensor value to be re-transmitted is determined based on information of the frame determined by the frame monitoring circuit at the occurrence of the instantaneous power interruption.

7. The communication apparatus according to claim 6, wherein
    at the re-transmission in response to the restoration of the power, (i) the sensor value of an instant frame that was transmitted at the occurrence of the instantaneous power interruption, or (ii) the sensor value of a previous frame that was transmitted before the instant frame is re-transmitted.

8. The communication apparatus according to claim 6, wherein
    the frame monitoring circuit is configured to determine an instant frame at the occurrence of the instantaneous power interruption based on a pulse count in one frame.

9. The communication apparatus according to claim 6, wherein
    the frame monitoring circuit is configured to determine an instant frame at the occurrence of the instantaneous power interruption based on a time of a frame.

10. The communication apparatus according to claim 6, wherein the storage is configured to store, as the sensor value, the frame that was generated by the data source circuit using the data of the sensor value.

11. The communication apparatus according to claim 6, wherein
the storage is configured to store the sensor value, which has been processed by the signal processing circuit and which has not been used by the data source circuit to generate the frame.

12. The communication apparatus according to claim 6, wherein
at the re-transmission of the sensor value, the transmission circuit is configured to add diagnostic information indicating the occurrence of the instantaneous power interruption.

13. The communication apparatus according to claim 6, wherein
the instantaneous power interruption detection circuit is configured to detect the instantaneous power interruption based on a voltage level to which the supply voltage of the power is decreased.

14. The communication apparatus according to claim 6, wherein
the instantaneous power interruption detection circuit is configured to detect the instantaneous power interruption based on a period of time of the instantaneous power interruption.

15. The communication apparatus according to claim 6, further comprising:
a switching timing setting circuit configured to adjust a switching timing of the signal switching performed by the switching circuit.

16. The communication apparatus according to claim 6, wherein
signals are transmitted using the digital communication method used in an in-vehicle environment.

17. A communication apparatus that operates with a supply voltage of a power and transmits a sensor value with a digital communication method using consecutive frames, comprising:
a signal processing circuit configured to process as a sensor value a signal input from a sensor;
a data source circuit configured to generate a frame using a data of the sensor value processed by the signal processing circuit;
a transmission circuit configured to transmit a digital signal to an outside source using a generated frame;
an instantaneous power interruption detection circuit configured to detect an instantaneous power interruption that is a temporary decrease in the supply voltage of the power;
a storage configured to store a predetermined value that indicates an occurrence of the instantaneous power interruption or an alternative value of the sensor value;
a switching circuit configured to perform a signal switching to permit the transmission circuit to perform a re-transmission of re-transmitting a signal including the predetermined value stored in the storage in response to a restoration of the power after the instantaneous power interruption; and
a transmission completion monitoring circuit configured to monitor a completion of data transmission of the predetermined value stored in the storage at the re-transmission in response to the restoration of the power.

18. The communication apparatus according to claim 17, wherein
the instantaneous power interruption detection circuit is configured to detect the instantaneous power interruption based on a voltage level to which the supply voltage of the power is decreased.

19. The communication apparatus according to claim 17, wherein
the instantaneous power interruption detection circuit is configured to detect the instantaneous power interruption based on a period of time of the instantaneous power interruption.

20. The communication apparatus according to claim 17, further comprising:
a switching timing setting circuit configured to adjust a switching timing of the signal switching performed by the switching circuit.

21. The communication apparatus according to claim 17, wherein
signals are transmitted using the digital communication method used in an in-vehicle environment.

* * * * *